(12) United States Patent
Murnane, Jr. et al.

(10) Patent No.: US 8,756,972 B2
(45) Date of Patent: Jun. 24, 2014

(54) VAPOR RETENTION APPARATUS AND METHOD FOR LIQUID VOLUMETRIC TEST MEASURE

(75) Inventors: Robert M. Murnane, Jr., Hamilton, NJ (US); Christopher Lewis Bradley, Maple Shade, NJ (US); Henry Vernon Oppermann, New Orleans, LA (US)

(73) Assignee: Pemberton Fabricators, Inc., Rancocas, NJ (US)

( * ) Notice: Subject to any disclaimer, the term of this patent is extended or adjusted under 35 U.S.C. 154(b) by 177 days.

(21) Appl. No.: 12/962,175

(22) Filed: Dec. 7, 2010

(65) Prior Publication Data

US 2012/0137750 A1 Jun. 7, 2012

(51) Int. Cl.
 *G01F 25/00* (2006.01)
(52) U.S. Cl.
 USPC ............................................................ 73/1.36
(58) Field of Classification Search
 USPC ........... 73/432.1, 1.32, 1.31, 1.36, 1.02, 1.13, 73/149, 429, 3, 861, 427; 239/34; 222/1
 See application file for complete search history.

(56) References Cited

U.S. PATENT DOCUMENTS

| 2,031,230 | A | * | 2/1936 | Seraphin | 73/427 |
| 2,742,789 | A | * | 4/1956 | Seraphin | 73/427 |
| 7,044,342 | B2 | * | 5/2006 | Carlton | 222/481.5 |
| 2009/0188298 | A1 | | 7/2009 | Murnane, Jr. | |

FOREIGN PATENT DOCUMENTS

CA 2626280 A1 7/2008

OTHER PUBLICATIONS

NIST Handbook 105-3, Specifications and Tolerances for Reference Standards and Field Standard Weights and Measures, Specifications and Tolerance for Graduated Neck Type Volumetric Field Standards, 36 pages, National Institute of Standards and Technology, Jun. 1997, Washington DC.
Canada Guidelines for the Calibration and Certification of Volumetric Standards, Rev. 1, 99 pages, Measurement Canada, Oct. 2008, Ottawa, Canada.
Richard C. Jordan, Design, Calibration and Operation of Field Standard Test Measures, Class #4040, Aug. 2000, 5 pages, Seraphin Test Measure Company, A Division of Pemberton Fabricators, Inc., Rancocas, NJ, USA.
Richard Jordan, Advances in Retail Motor Fuel Meter Calibration, PMAA Journal, Aug. 2001, 4 pages (reprint), The Petroleum Marketers Association of America, Arlington, VA, USA.

(Continued)

*Primary Examiner* — Daniel S Larkin
*Assistant Examiner* — Irving A Campbell
(74) *Attorney, Agent, or Firm* — Philip O. Post

(57) ABSTRACT

Volatile liquid vapors formed during the pour of the volatile liquid from a volumetric test measure apparatus are contained in a pour vapor-containment apparatus that enhances the rate of vapor formation inside the pour vapor-containment apparatus. The interface between a flow control component on the test measure apparatus and a pour inlet on the pour vapor-containment apparatus creates a positive pressure, vapor-saturated environment so that a sufficient positive vapor pressure is maintained between the interior of the test measure apparatus and the pour vapor-containment apparatus when the flow control component is inserted in the pour inlet and the test measure apparatus is rotated about vertical during the pour and drain processes so that the vapor-saturated air formed in the pour vapor-containment vessel transfers during the pour into the interior of the test measure apparatus to replace the liquid that is poured out of the test measure apparatus.

13 Claims, 8 Drawing Sheets

(56) References Cited

OTHER PUBLICATIONS

Lab Measures, Seraphin Series C Slicker Plate, Pub E91-3033, 2004, 2 pages, Seraphin Test Measure, A Division of Pemberton Fabricators, Inc., Rancocas, NJ, USA.

Operating and Maintenance Instructions, Jul. 2004, Pub E91-4011, 8 pages, Seraphin Test Measure, A Division of Pemberton Fabricators, Inc., Rancocas, NJ, USA.

Test Measures, Seraphin Series E Test Measure, Pub. E91-3011, 2004, 2 pages, Seraphin Test Measure, A Division of Pemberton Fabricators, Inc., Rancocas, NJ, USA.

* cited by examiner

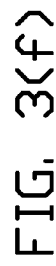
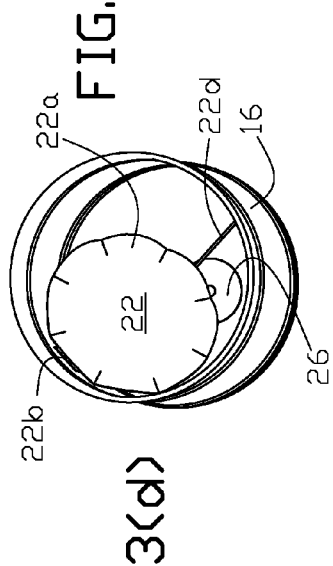
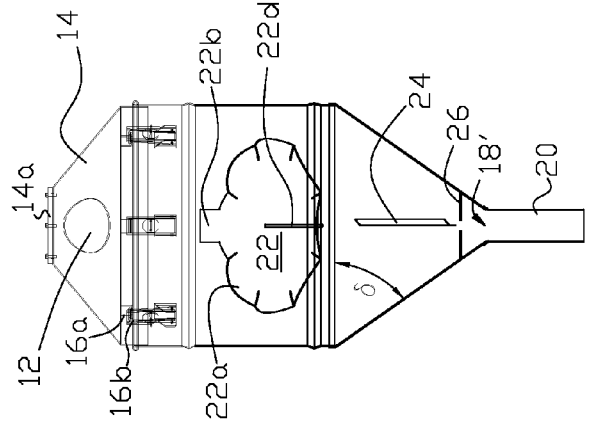
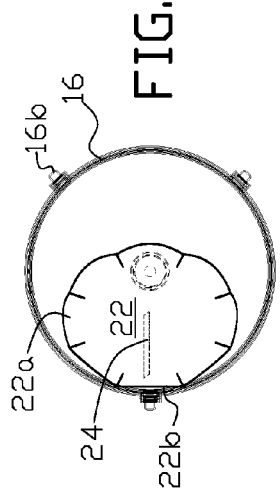
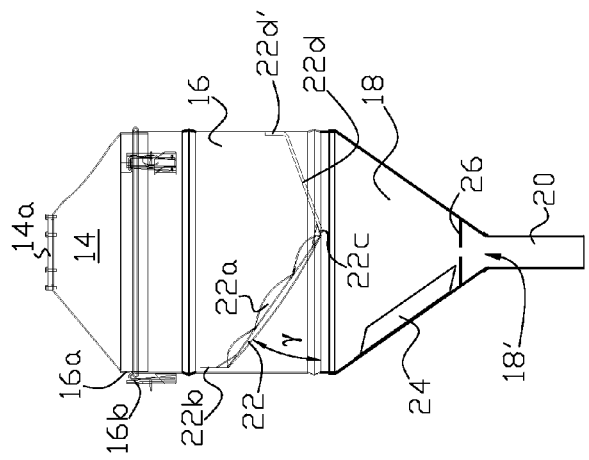
FIG. 3(e)
FIG. 3(g)
FIG. 3(d)
FIG. 3(c)
FIG. 3(f)
FIG. 3(b)

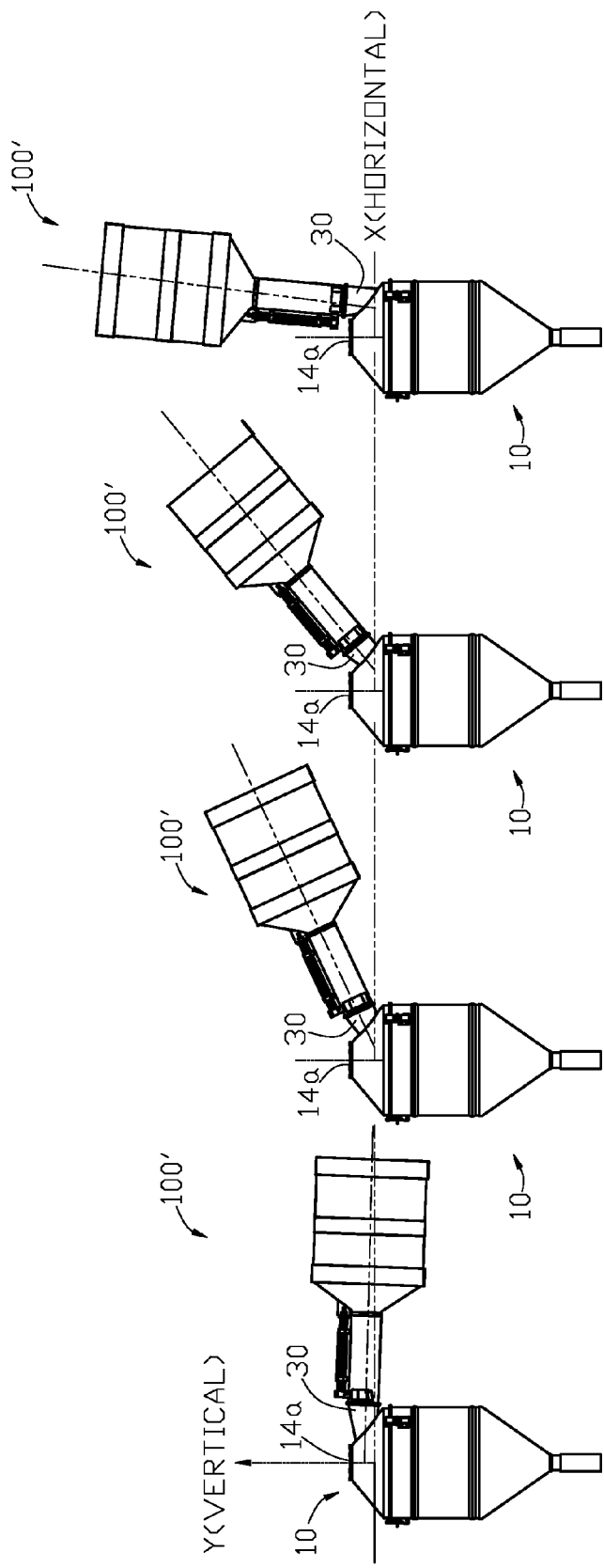

VAPOR RETENTION APPARATUS AND METHOD FOR LIQUID VOLUMETRIC TEST MEASURE

CROSS REFERENCE TO RELATED APPLICATIONS

Not applicable.

FIELD OF THE INVENTION

The present invention relates to vapor retention in a liquid volumetric test measure apparatus during use of the apparatus in measuring the accuracy of a meter associated with a volatile liquid dispenser.

BACKGROUND OF THE INVENTION

Liquid volumetric test measurement apparatus include field test measure apparatus (commonly called a "prover") that can be used to test the accuracy of the volumetric meter for a pump dispenser of a liquid. For example a prover can be used to test the accuracy of, and calibrate, the meter for a gasoline or diesel fuel pump dispenser at a gas station (gas bar). The prover is a precisely constructed vessel for holding an amount of the liquid that is pumped into the prover and includes an integrated gauge for precisely measuring the amount of liquid pumped into the prover through the dispenser's nozzle. Typically meter calibration for a gasoline or diesel fuel pump dispenser at a gas station may be accomplished by pumping a selected volume of the gasoline or diesel fuel into the prover that is indicated by a reading on the dispenser, for example 5.0 gallons. The dispenser's meter reading is then compared with the reading on the prover's integrated gauge to determine the precise amount of the fuel pumped into the prover, for example 4.75 gallons. In this the example the dispenser's meter delivery needs to be adjusted upwards since the dispenser's meter delivery is reading 0.25 gallons less than the actual volume as determined by the prover's gauge. The accumulated 4.75 gallons of fuel in the prover is poured out of the prover, and the prover is refilled again from the pump dispenser after the upwards adjustment of the pump dispenser's meter delivery. There is a standard procedure for pouring the accumulated fuel out of the prover since some fuel will remain in the prover due to adhesion of the fuel to the interior walls and bottom of the prover; that is, with each "emptying" of the prover, the goal is to keep precisely the same quantity of residue fuel by adhesion in the prover so that subsequent accuracy test volumes of the fuel pumped into the prover are not affected by deviations in the retained adhesion fuel in the prover from the previous emptying pour from the prover.

One example of a field test measure apparatus 100 (also referred to as a "prover" or simply "test measure") that is used for calibration of gasoline or diesel fuel dispensers at gasoline stations is SERAPHIN® brand "Series E" test measure, which is illustrated in FIG. 1 and is available from Pemberton Fabricators, Inc., Rancocas, N.J., USA. Typical capacities of this type of handheld provers are from 1 U.S. gallon (5 liters) to 10 U.S. gallons (40 liters) of gasoline or diesel fuel. These provers are designed for top fill from a dispenser's nozzle 90 (partially shown in FIG. 1 in dashed lines) and top manual pour (emptying) from the prover. The prover is constructed from a material that does not react with the liquid being measured, and its interior volume is precisely calibrated to an integral gauge. For example if the liquid is a gasoline or diesel fuel, a stainless steel composition can be a selected material for fabrication of the prover. A handheld prover typically includes a rotatably-fastened handle 102; a neck section 104; a rolled bead top opening 104a at the liquid entry and exit end of the neck section; an integral gauge assembly 106 mounted on the neck section with a volumetric gauge in communication with the liquid level inside the neck section; a top cone section 108 having a pitch angle α; a cylindrical liquid containment section 110; and an interior bottom 112 (shown in dashed lines) that may be concave in shape.

As mentioned above the manual pour of liquid from the prover is controlled so that the volume of adhesion liquid left in the prover after repeated emptying of the prover remains consistently the same. For example in the United States, the national standard for pour control is currently contained in National Institute of Standards and Technology (NIST) Handbook 105-3 (2010) entitled "Specifications and Tolerances for Graduated Neck Type Volumetric Field Standards." According to this NIST Handbook, handheld test measure apparatus require a 30 second (s) (±5 s) pour followed by a 10 s drain, with the apparatus held at a 10° to 15° angle from vertical during calibration and use. In Canada, the standard for pour control is currently contained in Measure Canada's "Guidelines for the Calibration and Certification of Volumetric Standards" (Issued October 2008; Revision Number: Rev. 1). The test measure apparatus is drained while tipping it upside down over a 30-second period. When the main flow ceases and the dribble of the liquid breaks into drops, the apparatus is turned completely upside down for a time period determined by the capacity of the test measure.

The volume of gasoline or diesel fuel (product) pumped into the prover from the pump dispenser is typically poured back into an underground storage tank (UST) 92 for the gasoline or diesel fuel via the UST fill tube 92a after removal of the UST fill tube grade cover 92b and fill cap 92c as illustrated in FIG. 2(a) and FIG. 2(b). Although a standard procedure, as described above, is followed for the manual pour from the prover into the UST fill tube, ambient air that is not saturated with product vapors enters the test measure apparatus, which results in the vaporization of liquid product when the test measure apparatus is filled with the next delivery from the fuel dispenser.

It is one object of the present invention to provide vapor containment and retention apparatus and methods during the pour of a volatile liquid from a test measure apparatus.

It is another object of the present invention to provide vapor containment and retention apparatus and methods during the pour of a volatile liquid from a test measure apparatus to improve the accuracy and repeatability of the test process.

It is another object of the present invention to expeditiously create from the volatile liquid poured into the pour vapor-containment apparatus a vapor-saturated environment within the pour vapor-containment apparatus from a test measure apparatus and transfer the vapor-saturated environment to the interior of the test measure apparatus to reduce vaporization losses during repeated calibrated volumetric pours into the test measure apparatus.

It is another object of the present invention to reduce the vaporization of a volatile liquid in an existing test measure apparatus without changing the capacity of the existing test measure apparatus or the existing test measure apparatus integrated gauge assembly's graduated scale.

It is another object of the present invention to allow users of an existing test measure apparatus to empty the apparatus using existing pour and drain procedures with minimal modifications and with improved accuracy and repeatability of the test process.

BRIEF SUMMARY OF THE INVENTION

In one aspect the present invention is apparatus and method for retention of vapor generated from the pour of a volatile liquid from a liquid volumetric test measure apparatus.

In another aspect the present invention is a pour vapor-containment apparatus. The apparatus has an upper section containing an inlet, a midsection containing a volatile liquid disperser; and a lower section containing an outlet and a flow restrictor. The flow control component of a test measure apparatus can be inserted into the inlet when a volatile liquid contained in the test measure apparatus is poured into the pour vapor-containment apparatus. The volatile liquid stream pouring into the containment apparatus forms a vapor-saturated environment with a positive pressure within the containment apparatus that is rapidly created by contact and dispersal of the stream when the stream makes contact with the volatile liquid disperser. The remaining non-vaporized volatile liquid flows to the lower section of the containment apparatus where flow of the volatile liquid through the outlet of the containment apparatus is restricted by the flow restrictor so that a liquid barrier is established between the outlet of the containment apparatus and the vapor-saturated environment in the containment apparatus that is in communication with the inlet and the interior of the test measure apparatus by the flow control component inserted in the inlet, which causes flow of the vapor-saturated environment into the interior of the test measure apparatus. In some examples of the invention, the pour vapor-containment apparatus may be funnel-shaped in part, with the upper section in the shape of a conical frustum; the midsection in the shape of a cylinder; and the lower section in the shape of a conical frustum invertedly oriented to the upper section.

The test measure apparatus used with the pour vapor-containment apparatus of the present invention preferably has a flow control component that can be inserted into the inlet of the pour vapor-containment apparatus during pour of the volatile liquid from the test measure apparatus into the pour vapor-containment apparatus. The flow control component may form an integral part of the test measure apparatus or be a removable component of the test measure apparatus that can be inserted on the test measure apparatus and/or in the inlet during the pour and drain of the volatile liquid from the test measure apparatus. The flow control component and inlet are preferably coordinated in configuration so that as the test measure apparatus is tilted about vertical to pour and drain the volatile liquid from the test measure apparatus into the containment apparatus, the combination of pouring volatile liquid into the pour vapor-containment apparatus faster than the liquid can drain due to the restriction on the outlet flow from the pour vapor-containment apparatus creates a positive pressure of saturated vapor from the liquid seal at the bottom of the pour vapor-containment apparatus to the inlet of the pour vapor-containment apparatus, which physically includes the outlet end of the flow control component of the test measure apparatus. The flow control component may be shaped as a spout in some examples of the invention. In some examples of the invention the inlet may have a generally elliptical perimeter and the spout may be in the shape of a skewed elliptical cylinder with elliptically-shaped horizontal cross sections that have increasing major axes as the cross section moves away from the inlet of the spout.

In another aspect the present invention is a method of emptying a volatile liquid from a test measure apparatus for volumetric liquid measurement of the volatile liquid. A flow control component on the test measure apparatus is oriented so that the outlet end of the flow control component extends into an inlet disposed within a pour vapor-containment apparatus. The inlet is in communication with an interior volume of the pour vapor-containment apparatus, with the interior volume being closed except for the inlet and an outlet. The test measure apparatus is oriented so that the outlet end of the flow control component is extended into the inlet to establish a pour flow of the volatile liquid from the test measure apparatus into the interior volume of the pour vapor-containment apparatus. Pouring the liquid into the pour vapor-containment apparatus faster than the restrictor allows it to drain, creates the positive pressure, vapor-saturated environment inside the pour vapor-containment apparatus, which prevents ambient air that is not vapor saturated from entering the test measures apparatus and causes the test measure apparatus to fill with vapor-saturated air as the liquid is emptied from the test measure apparatus. A vapor-saturated environment at a positive pressure is generated in the section of the interior volume during the pour flow of the volatile liquid into the interior volume of the pour vapor-containment apparatus with the vapor-saturated environment flowing into the test measure apparatus via the outlet end of the flow control apparatus on the prover. After the pour flow and a drain of the volatile liquid from the test measure, the flow control component is withdrawn from the inlet of the pour vapor-containment apparatus, and the volatile liquid barrier around the outlet of the pour vapor-containment apparatus is terminated by allowing the volatile liquid forming the volatile liquid barrrier to drain out of the outlet.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings:

FIG. 2(*b*) is a cross sectional view of a prior art test measure apparatus pouring a volatile liquid into the fill tube of an underground storage tank.

FIG. 3(*b*) is a side partial cross sectional elevation view of the pour vapor-containment apparatus shown in FIG. 3(*a*).

FIG. 3(*c*) is a front partial cross sectional elevation view of the pour vapor-containment apparatus shown in FIG. 3(*a*) with the front of the pour vapor-containment apparatus defined as the view facing the inlet on the apparatus.

FIG. 3(*d*) is a top plan view of the pour vapor-containment apparatus shown in FIG. 3(*a*) with the upper section removed.

FIG. 3(*e*) is an isometric view of the pour vapor-containment apparatus shown in FIG. 3(*b*), FIG. 3(*c*) and FIG. 3(*d*) with the upper section removed.

FIG. 3(*f*) is a partial side cross sectional elevation view of the lower section of the pour vapor-containment apparatus shown in FIG. 3(*a*).

FIG. 3(*g*) is a top plan view of one example of a flow restrictor used in the pour vapor-containment apparatus shown in FIG. 3(*b*) through FIG. 3(*f*).

FIG. 6(a) through FIG. 6(d) illustrates the test measure apparatus shown in FIG. 4(a) at various angles from vertical with its flow control component inserted in the inlet of the pour vapor-containment apparatus.

DETAILED DESCRIPTION OF THE INVENTION

There is shown in the figures one example of a pour vapor-containment apparatus 10 (also referred to as the "containment apparatus") of the present invention. Reference is made to a "volatile liquid" as the liquid being poured from a test measure apparatus into a pour vapor-containment apparatus of the present invention, which may be, for example, highly volatile gasoline, less volatile diesel fuel, or other volatile liquid dispensed from a liquid dispenser using a meter requiring accuracy testing and calibration by means of a liquid volumetric test measure apparatus.

Figure 3J:
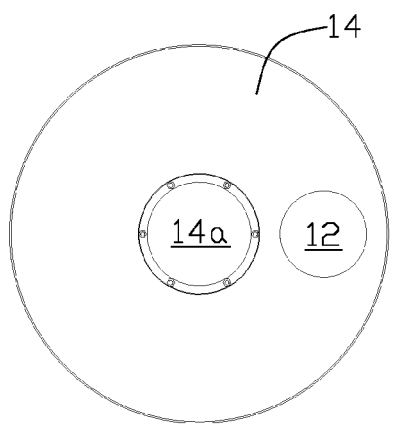
FIG. 3(j) is a top plan view of the upper section of the pour vapor-containment apparatus shown in FIG. 3(a).
Figure 3A:
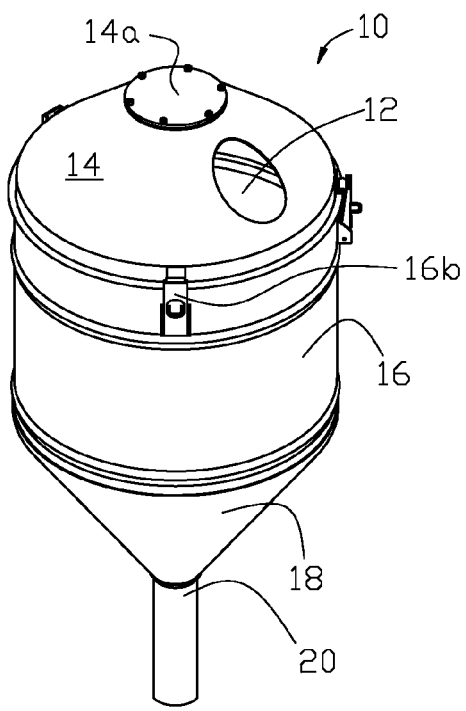
FIG. 3(*a*) is an isometric view of one example of a pour vapor-containment apparatus used in the present invention.
FIG. 3(h) is a side elevational view of one example of a volatile liquid disperser used in the pour vapor-containment apparatus shown in FIG. 3(b) through FIG. 3(e).
FIG. 3(i) is a front elevational view of the volatile liquid disperser shown in FIG. 3(h).
FIG. 3(k) is a side elevational view of the upper section shown in FIG. 3(j).
Figure 3K:
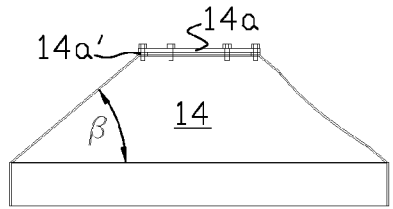
Figure 3H:
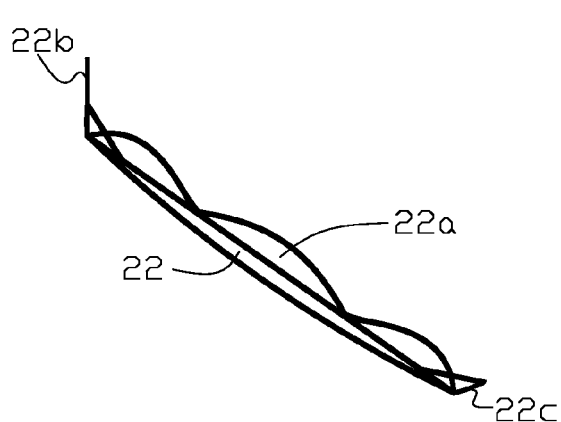
Figure 3I:
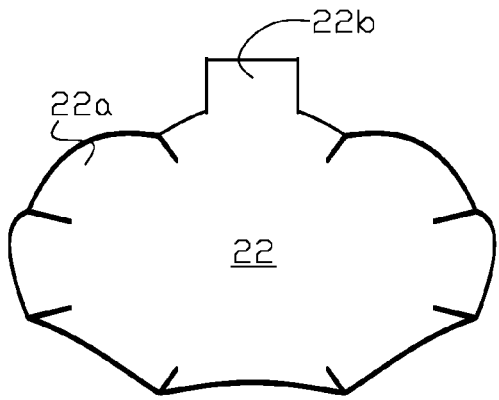

Referring to FIG. 3(a), pour vapor-containment apparatus 10 has an inlet 12 in upper section 14 for insertion of a flow control component associated with a test measure apparatus as further described below. In this typical, but non-limiting example, the upper section is a top cover, which may be generally a conical frustum in shape, as seen in FIG. 3(j) and FIG. 3(k) with pitch angle β. Inlet 12 is in communication with the interior volume of the pour vapor-containment apparatus 10 formed by the upper section, a midsection and a lower section in this example of the invention.

In this particular example of the invention midsection 16 is generally cylindrical in shape. A means for dispersing the stream of volatile liquid in the interior volume of the pour vapor-containment apparatus is provided to efficiently increase the surface area of the volatile liquid pouring into the pour vapor-containment apparatus from a test measure, which results in rapid formation of a positive pressure vapor-saturated environment in the pour vapor-containment apparatus that is directed towards the flow control component inserted in inlet 12 during a pour from a test measure as further described below. An example of such means is a volatile liquid disperser disposed along one interior side of midsection 16 shown as a generally circular (splash) disperser plate 22 as best seen in FIG. 3(b) through FIG. 3(e), FIG. 3(h) and FIG. 3(i). A means for supporting disperser plate 22 in the pour vapor-containment apparatus is shown in the figures, namely plate upper tab 22b is affixed to the interior wall of the pour vapor-containment apparatus 10 and plate lateral brace 22d is affixed at one end to a lower edge 22c of the disperser plate, and at the opposing end to the interior wall of the pour vapor-containment apparatus at connection 22d'. Plate lateral brace 22d may comprise one or more metal strips extending laterally from the edge of the disperser plate to the interior wall. The plane of disperser plate 22 is disposed an angle γ from vertical so that the flow stream of volatile liquid into the pour vapor-containment apparatus through inlet 12 impinges at least partially on the surface of the plate as illustrated by flow stream 94 (shown solid black in FIG. 7(a)) to disrupt the flow of the volatile liquid and cause splashing, which quickly generates a vapor-saturated environment inside the pour vapor-containment apparatus. In this example of the invention, disperser plate 22 has optional scalloped protrusions 22a extending around the perimeter of the plate that are disposed at an upwards angle relative to the plane of the plate's splash surface to aid in dispersed roll-off of the volatile liquid from the plate's surface. The saturated vapor is drawn into the test measure as it is emptied to create a vapor-saturated environment inside the test measure. The means for dispersing the stream of volatile liquid in the interior volume of pour vapor-containment apparatus may be any structural element (or combination of structural elements) that disrupts the flow of the volatile liquid, such as, but not limited to, a rectangular plate or series of strips separated from other by a small distance.

In this particular example of the invention lower section 18 is generally a conical frustum in shape that is invertedly oriented to the shape of the vertical frustum forming the upper section and has a conical pitch angle 6 from horizontal as shown in FIG. 3(c). The lower section of the containment apparatus comprises an outlet 18' and an outlet flow restrictor. The outlet flow restrictor may be integral to the outlet or a separate element. The outlet itself, or optionally in combination with the configuration of the lower section, may restrict outlet flow to achieve the desired restricted flow as described below. In this particular example of the invention, outlet flow restriction is achieved by flow restrictor 26, which comprises an orifice plate with orifice 26a as best seen in FIG. 3(f) and FIG. 3(g). The flow restrictor is disposed above outlet 18', which is in communication with a drain that comprises drain spout 20. In this example of the invention, the drain is a vertically-oriented pipe as best seen in FIG. 3(b), FIG. 3(c) and FIG. 3(f). The drain may be otherwise arranged for a particular application, for example, as a pipe angled off-vertical in communication with the bottom or side of the lower section of the pour vapor-containment apparatus.

In the particular example of a pour vapor-containment apparatus 10 shown in the drawings, upper section 14, midsection 16 and lower section 18 form a substantially closed environment in the interior of the containment apparatus except for inlet 12 in the upper section and outlet 18' in the lower section. When a volatile liquid barrier is established and maintained in the interior of the pour vapor-containment apparatus due to the flow restriction, inlet 12 is isolated from outlet 18' to establish a closed environment above the volatile liquid barrier except for inlet 12. Drain flow of the volatile liquid from the pour vapor-containment apparatus is restricted, either by the configuration of the drain and/or lower section 18, or by additional flow restricting components inserted in the lower section, such as flow restrictor 26 as described above, to sustain the volatile liquid barrier over the drain and block air from entering through the drain while the test measure is being emptied. Flow restriction in the lower section of the pour vapor-containment apparatus is arranged so that there is a volatile liquid barrier in the containment apparatus at least until the test measure apparatus pour and drain process is complete, and the flow control component of the test measure is removed from the inlet of the containment apparatus. As further described below, the dimensions of the test measure's flow control component is sized with respect to the opening dimensions of inlet 12 so that the interface formed between the exterior of the flow control component inserted in the inlet and the opening perimeter of the inlet is effectively vapor-sealed to create the positive pressure vapor-saturated environment inside the pour vapor-containment apparatus.

A means for observing the flow of the volatile liquid from the test measure into the pour vapor-containment apparatus can be provided in the upper section of apparatus 10. For example, one or more translucent view ports 14a may be suitably positioned in upper section 14 and affixed to the upper section via a suitable seal 14a' as best seen in FIG. 3(k). Upper section 14 may be detachable from midsection 16, for example, by a plurality of hooks 16a and interlocking latches 16b distributed around the perimeters of the upper section and midsection, respectively.

One or more optional baffles 24 can be provided in lower section 18 to disturb any coriolis (swirl) flow and further enhance vapor formation in the apparatus. A filter screen (not shown in the drawings) may be provided over outlet 18' to keep extraneous particulate from exiting the pour vapor-containment apparatus with the volatile liquid. Pour vapor-containment apparatus 10 may be constructed from a stainless steel composition. As illustrated in FIG. 3(f) a suitable spark prevention element, such as but not limited to, a copper composition sleeve 20a may be provided around the exterior of drain 20 to prevent sparks when the drain is inserted into an interfacing external drain conduit.

While the means for dispersing the stream of volatile liquid is contained within the midsection of the containment apparatus shown in the drawings, more generally, said means can be disposed anywhere above the volatile liquid barrier formed within the containment apparatus.

Figure 1:
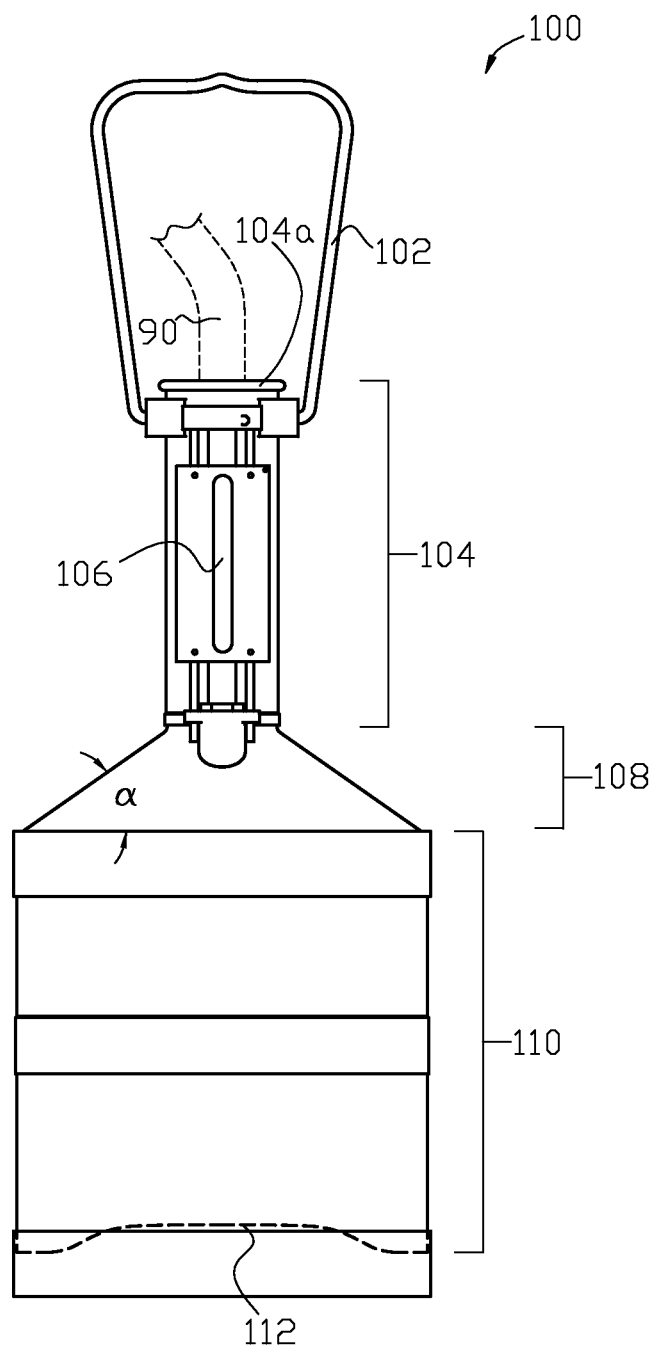
FIG. 1 is an elevational view of one example of a prior art test measure apparatus.
Figure 2B:
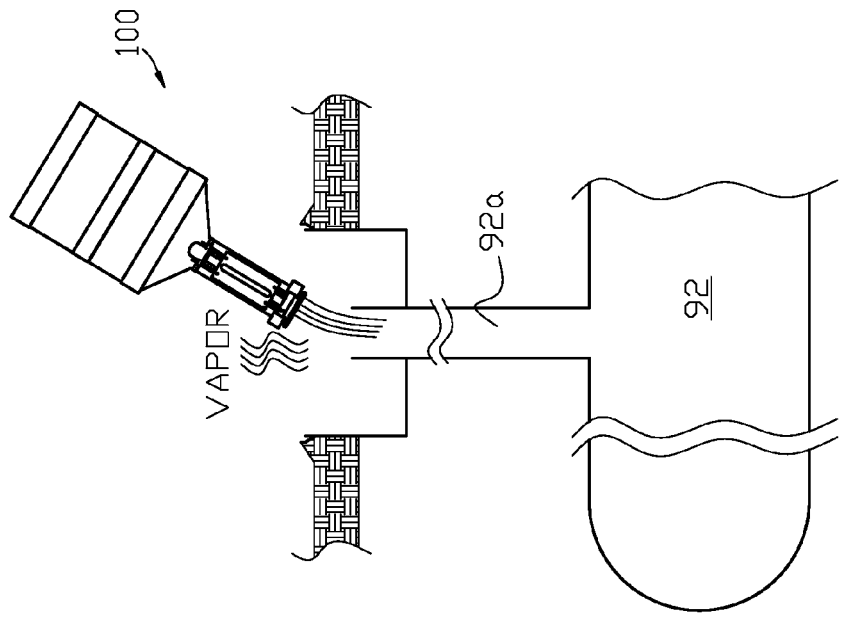
FIG. 2(*a*) is a partial cross sectional view of a typical underground storage tank for a volatile liquid.
Figure 2A:
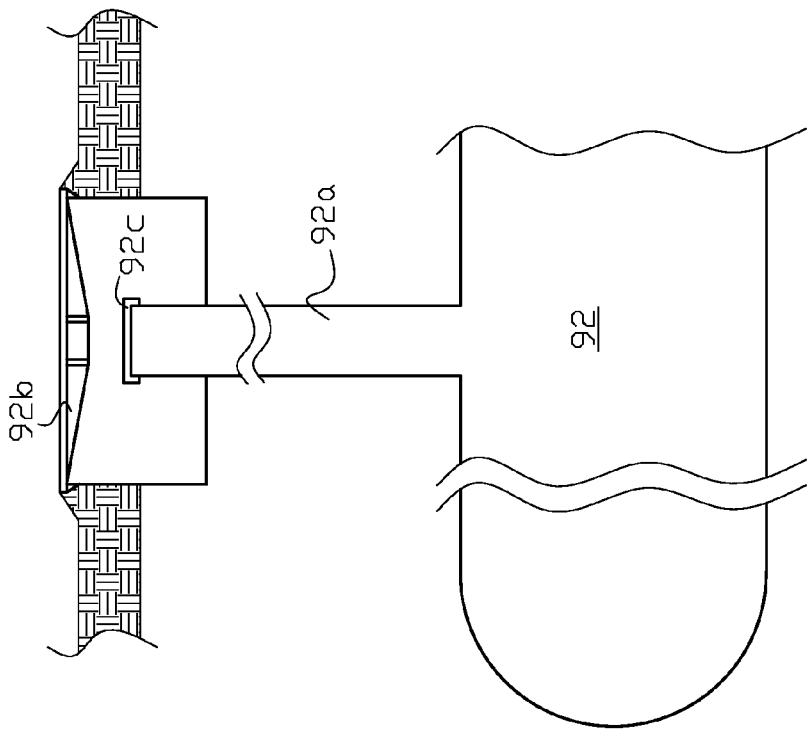

As mentioned above, a test measure apparatus used with the pour vapor-containment apparatus 10 of the present invention has a means for volatile liquid flow control from the test measure into the containment apparatus and saturated vapor flow from the containment vessel to the test measure apparatus while there is flow of the volatile liquid from the test measure apparatus. Most generally, said means is a flow control component forming a permanent or removable part of the test measure apparatus. In some examples of the invention, the flow control component can be in the shape of a tube, or spout, projecting from the top opening of the test measure shown in FIG. 1. While a particular top-pour test measure apparatus is illustrated in the figures, any type of top-pour test measure apparatus, with an appropriately configured flow control component, may advantageously be used with the pour vapor-containment apparatus of the present invention as long as the test measure's top fill and pour opening is configured for, or can be configured for, proper interface with inlet 12 of the containment apparatus. For example, the test measure's fill-and-pour opening may have an integrated projecting tube or spout, or a spout that that is hinged-fastened to the top opening of the test measure so that the top opening may be used for filling the test measure, and the spout may be used for emptying the test measure into the containment apparatus. Alternatively the spout may be a removably attached to the top opening of the test measure so that the spout can be removed for filling the test measure, and attached for emptying the test measure into the pour vapor-containment apparatus.

Whatever type of flow control component is used with a test measure apparatus in the present invention, the flow control component must fit and sufficiently seal into inlet 12 on pour vapor-containment apparatus 10 continuously through rotation of the flow control component and test measure from horizontal to at least the maximum angle required for performance of a volumetric meter accuracy test that the test measure apparatus is intended to prevent ambient air that is not vapor saturated from entering the test measure apparatus so that a repeatable vapor-saturated environment is achievable in the test measure apparatus after each emptying of the volatile liquid from the test measure apparatus.

Figure 4C:
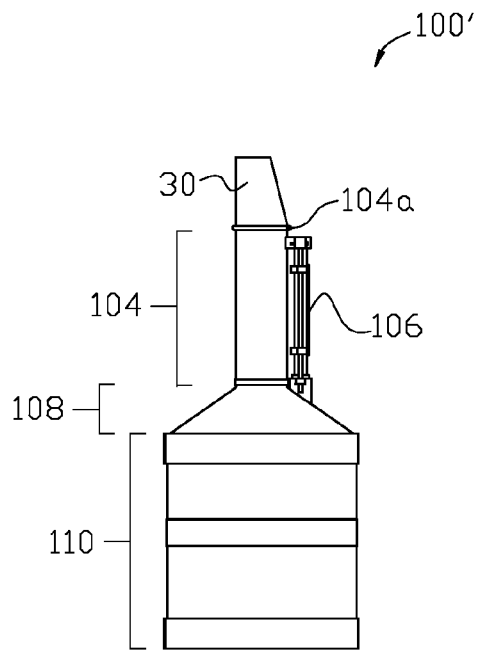
FIG. 4(c) is a side elevational view of the test measure apparatus shown in FIG. 4(a).
Figure 4B:
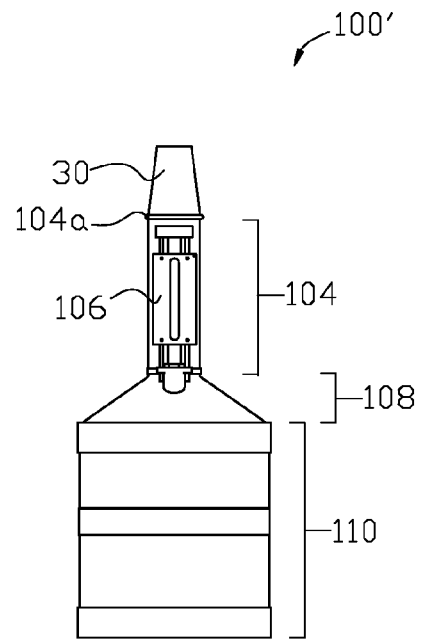
FIG. 4(b) is a front elevational view of the test measure apparatus shown in FIG. 4(a) with the front of the test measure apparatus defined as the view with the gauge assembly.
Figure 4A:
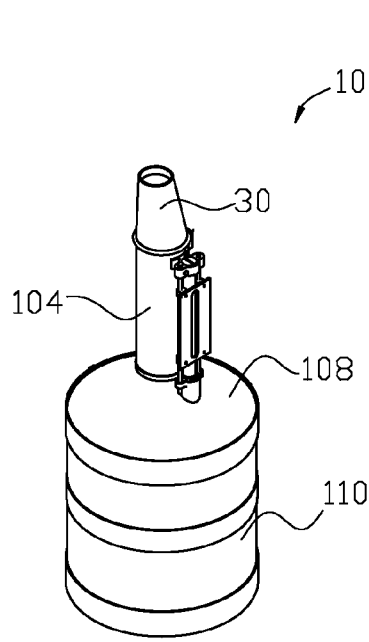
FIG. 4(a) is an isometric view of one example of a test measure apparatus that can be used in the present invention.
Figure 7A:
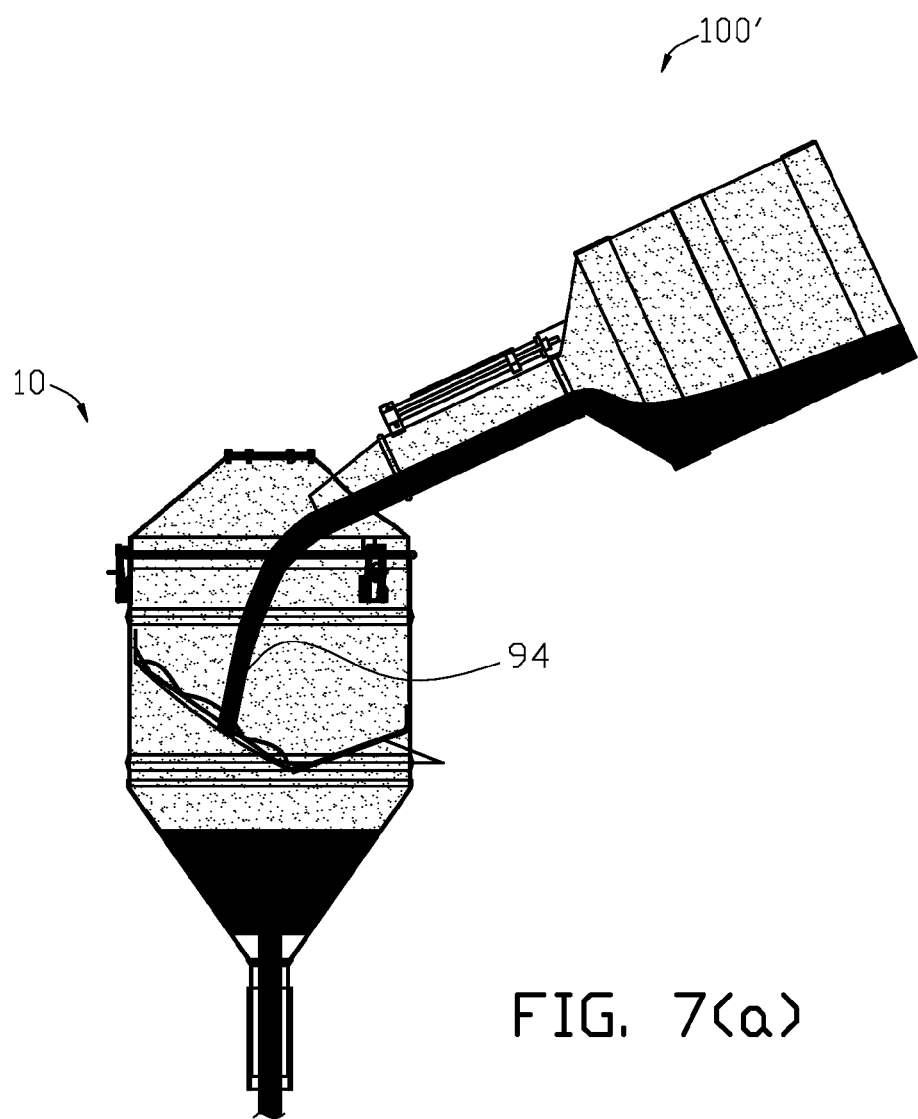
FIG. 7(a) illustrates the vapor and liquid distribution within the pour vapor-containment apparatus and test measure apparatus during a pour with the test measure apparatus at a pour angle from vertical shown in FIG. 6(b).
Figure 7B:
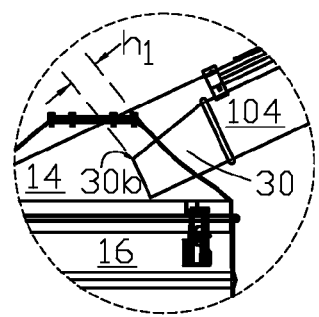
FIG. 7(b) is a detail view of a flow control component inserted in the inlet of a pour vapor-containment apparatus.

There is shown in the FIG. 4(a) through FIG. 4(c) one example of an existing test measure apparatus (similar to that shown in FIG. 1) as modified with spout 30 for use as modified test measure apparatus 100' with a pour vapor-containment apparatus of the present invention. Any type of suitable test measure handling apparatus, such as, but not limited to, handle apparatus 102 in FIG. 1 may be utilized with test measure apparatus 100', although such feature is not directly pertinent for the purposes of the present invention. Base 30a (shown in FIG. 4(d)) of spout 30 may be permanently or removably affixed to the opening in neck 104 of test measure apparatus 100. If permanently affixed, then the roller bead at top opening 104a may be eliminated. In this particular example of the invention, spout 30 is in the shape of a skewed elliptical cylinder having elliptically-shaped horizontal cross sections, as representatively shown in FIG. 4(d), and interfacing inlet 12 on pour vapor-containment apparatus is generally elliptical in shape with major axis generally inline with the major axes of the spout's elliptical cross sections. The spout tapers down in cross sectional dimension from spout base 30a to spout outlet 30b so that the major axes of the elliptical cross sections decrease from the spout base to outlet as representatively shown for two spout cross sections with major axes $x_1$ and $x_2$ in FIG. 4(d). The elliptical cross sections can degenerate into circles at spout base 30a if opening 104a on the existing test measure is circular in cross section. The overall length, or height, h, of the spout and rate of taper of the cross sections are selected relative to the dimensions of inlet 12 on the containment apparatus so that a suitable length, $h_1$, of the spout from the spout outlet 30b is disposed within the interior volume of containment apparatus 10 (as shown for example in FIG. 7(a)) when the tapered spout is seated in the spout opening and rotated with the attached test measure apparatus so that the positive pressure vapor-saturated environment inside the pour vapor-containment apparatus is drawn into the test measure apparatus as the volatile liquid pours out of the test measure and into the pour vapor-containment apparatus as illustrated in FIG. 7(a) and FIG. 7(b). Conversely when the tapered spout is seated in the inlet opening, ambient air that is not saturated with volatile liquid vapors is prevented from entering the test measure apparatus through the spout/inlet interface as the test measure apparatus is rotated and emptied into the containment apparatus.

Figure 4D:
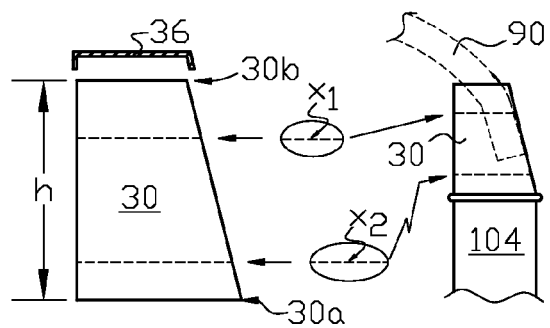
FIG. 4(d) is a partial side cross sectional elevation view of the upper portion of the test measure apparatus shown in FIG. 4(a) with a portion of a volatile liquid dispensing nozzle inserted in one example of a flow control component of the test measure apparatus.

If the spout in a particular example of the present invention is fixed to the test measure apparatus during the testing of the accuracy of a dispenser's meter by pumping volatile liquid into the test measure, spout outlet 30b may be sized for insertion of the volatile liquid dispensing nozzles on a variety of dispensers having different sizes of nozzles. However as shown in FIG. 4(d) the elliptical shape of spout outlet 30b permits various nozzle sizes with a smaller opening than generally circular opening 104a on the existing test measure and thereby reduces the amount of volatile liquid that can vaporize and escape to atmosphere during a fill of the test measure for an accuracy test of a dispenser's meter. Further a spout with elliptical cross sections facilitates insertion and seating of a typically curved nozzle 90 as shown in FIG. 4(d).

As mentioned above, the dimensions of inlet 12 is sized with respect to the dimensions of a particular spout to be inserted into the inlet so that the interface formed between the exterior of the spout inserted in the inlet and the perimeter of the spout opening maintains the positive pressure. In some examples of the invention, supplemental interface sealing means may be provided with apparatus 10 or spout 30. For example a spout sealing gasket comprising an elastomer, such as a rubber composition, may be suitably fitted around the outer perimeter of the spout, for example as a "boot," to seal against the outer surface of the upper section of the containment apparatus around inlet 12.

Figure 4E:
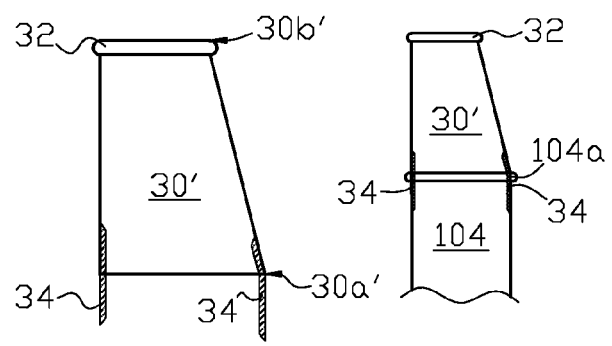
FIG. 4(e) is one example of an alternative removable flow control component shown attached and unattached to a test measure apparatus.

FIG. 4(e) illustrates one example of an alternative removable spout 30' with a test measure insertion fitting that is used to removably insert and hold spout 30' over opening 104a on existing test measure apparatus 100. In this example the test measure insertion fitting 34 is a ring insert affixed at one end around base 30a' of spout 30'. Fitting 34 extends beyond base 30a' for a removable insertion fit into opening 104a as shown in FIG. 4(e) for the pour of a volatile liquid from the test measure to a containment apparatus; spout 30' could be removed for fill of the test measure via opening 104a. In all examples of the invention, rolled bead 32 may be provided at the outlet of the pour control component, as shown, for example, in FIG. 4(e) for outlet 30b' of spout 30'.

In some examples of the invention, the flow control component may be a separate intervening apparatus having one end inserted into inlet 12 on the containment apparatus and the opposing end configured for sealed insertion of opening 104a on existing test measure 100. The intervening apparatus may be formed, for example, at least in part from a semi-rigid bellows elastomer that allows rotation of the test measure for pour of the volatile liquid from the test measure into the containment apparatus while maintaining a vapor seal through the intervening apparatus.

In the present example of the invention the shape and size of spout 30 on test measure apparatus 100' is such that the test measure can be emptied by gradually tilting the test measure. FIG. 6(a) through FIG. 6(d) are generally illustrative of a tilt range from near horizontal to near vertical. A continuous stream of the volatile liquid during the test measure's emptying process is critical to achieving a consistent amount of residual volatile liquid in the test measure to maintain the calibrated volume of the test measure. Spout opening size is a factor in maintaining a continuous stream of liquid. For example, if the spout opening is too small and the volatile liquid stream is of sufficient volume to create a liquid barrier in the spout or neck during a pour, air (or vapor-saturated environment in a containment apparatus) would periodically enter the test measure in bulk amounts as the vacuum in the test measure created by the liquid barrier in the spout periodically breaks. This "gulping" phenomenon causes sporadic splashing of the volatile liquid on the interior walls of the test measure, thereby changing the amount of residual liquid left in the test measure, which detrimentally affects the calibrated volume of the test measure.

A removable cap 36, or other suitable fitting, can be provided for substantially closing a spout's outlet 30b as shown in cross section in FIG. 4(d) so that the vapor-saturated environment achieved in the test measure apparatus by the present invention can be maintained until the next fill of the test measure during an accuracy test of a dispenser's meter. A means for pressure relief can be provided in the cap to allow pressure equalization inside and outside of the test measure apparatus.

In some examples of the invention, the flow control component may be indexed with inlet 12, for example, with a groove along the length of the flow control component and a protrusion in the inlet's opening on which the groove rides when the flow control component is properly inserted into the opening and rotated. In some examples of the invention, the exterior surface of the flow control component may be scored with indices to indicate when the flow control component inserted in inlet 12 and test measure apparatus are rotated at certain angles from vertical to assist the person pouring from the test measure in achieving a correct pour angle.

The following is one typical, but non-limiting example of a liquid volumetric test measure process of the present invention. Reference is made in this example to the test measure apparatus 100' in FIG. 4(a) through FIG. 4(c) although the process may be accomplished with other test measure apparatus as disclosed above. If the test measure apparatus used in the process is not in the "wet down" state defined by the interior of the test measure having a residual liquid and contained vapor-saturated environment, the test measure must be filled with the volatile liquid and emptied into a pour vapor-containment apparatus of the present invention to establish the "wet down" state in the test measure so that the vapor-saturated environment inside the "wet down" empty test measure will reduce vaporization of the volatile liquid in subsequent meter accuracy test fill and empty steps. Typically the test measure apparatus will not be in the defined "wet down" state if one of the following three conditions apply: (1) if the interior of the test measure is known to be dry; (2) if the test measure was last used with a volatile liquid having a different volatility; for example, if the test measure was last used with diesel fuel and will presently be used with gasoline; or (3) a sufficient period of time has passed since the fill or empty process steps have been performed so that the "wet down" state is no longer achieved in the test measure apparatus. For the purposes of this example the pour vapor-containment apparatus 10 shown in FIG. 3(a) through FIG. 3(d) is used although the process may be accomplished with other containment apparatus as disclosed above. Once the "wet down" state is achieved in test measure apparatus 100', spout outlet 30b should be closed, for example, by inserting a cap over the outlet except when executing the test measure fill and empty steps to retain the "wet down" state in the test measure. This is particularly necessary if the volatile liquid is a highly volatile liquid such as gasoline. Use of the cap will also help prevent spills of the contained volatile liquid.

Figure 5:
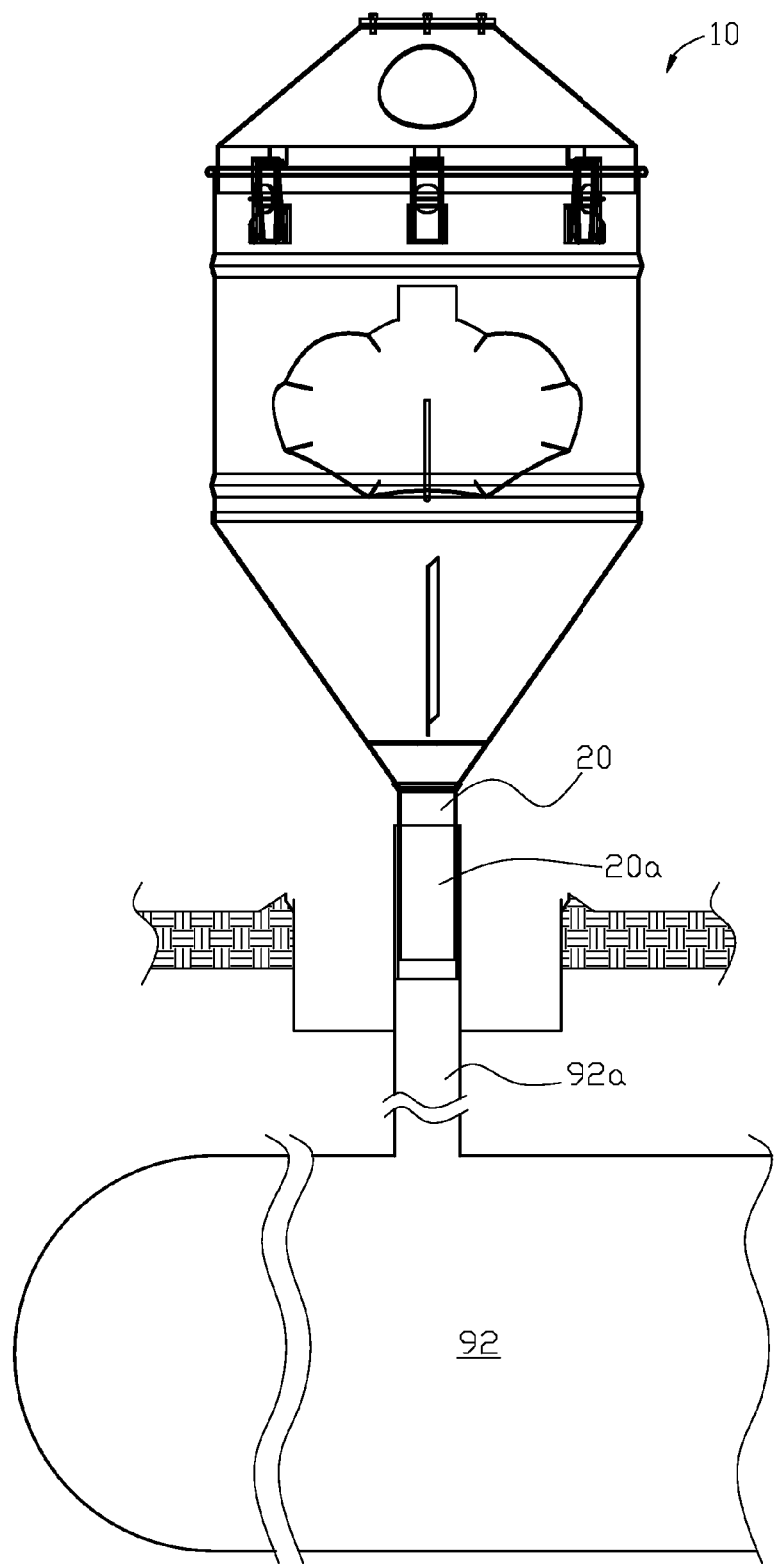
FIG. 5 illustrates the interface between the drain connected to one example of a pour vapor-containment apparatus of the present invention and an underground storage tank.

The following process steps are typically performed in filling a test measure apparatus of the present invention according to present test procedures and are described by way of example and not limitation. These test measure fill process steps apply to a "wet down" fill or a subsequent post "wet down" meter accuracy test fill as further described below. Pour vapor-containment apparatus 10 is positioned with its drain spout 20 disposed in the inlet of the container to which the volatile liquid poured into the pour vapor-containment apparatus from the test measure will be emptied. This container may be underground storage tank 92 with the drain spout 20 inserted in tank's fill tube 92a as shown, for example, in FIG. 5, with sleeve 20a interfacing between the drain spout and wall of the fill tube. Test measure apparatus 100' is positioned as it would normally be positioned for a fill, for example on a level surface. If the fill is a post "wet down" meter accuracy test fill, cap 36 will normally be positioned over spout outlet 30b, and will be removed at this time for the fill process steps. A test quantity of the volatile liquid is pumped into the spout opening from the dispenser, for example, by inserting the dispenser's nozzle 90 in spout outlet 30b as shown, for example, in FIG. 4(d). After delivering the test quantity of volatile liquid from the dispenser to the test measure apparatus, cap 36 is normally placed over spout outlet 30b. For a meter accuracy test fill, the volatile liquid volume in the test measure apparatus is read on the gauge associated with integral gauge assembly 106, and the dispenser's meter reading is compared with the test measure's gauge reading to determine if an adjustment of the dispenser's meter if necessary.

The following pour and drain process steps are typically performed for emptying a test measure apparatus of the present invention according to present test procedures and are described by way of example and not limitation. When the filled test measure apparatus 100' is positioned adjacent to pour vapor-containment apparatus 10, the test measure apparatus is repositioned so that the flow control component, namely spout 30 in this example, is inserted (seated) into inlet 12 at an initial small angle below horizontal as shown, for example, in FIG. 6(a) so that the pour of volatile liquid from the test measure apparatus will not yet begin. Performing the initial spout insertion leaves only a small gap between inlet 12 and the outer surface of spout 30 as disclosed above. The pour from the test measure is performed for a test time period measured from the start of pour flow to the emptying of the test measure. If the pour is accomplished according to the United States or Canadian standard described above, the test measure apparatus is emptied over a 30 s time period (±5 s). The pour flow may be observed through view port 14a in the upper section of the containment apparatus. Typically the test measure apparatus 100' angle from horizontal is first slowly increased (from the small pre-flow angle) and then more rapidly increased to result in an initial slow pour flow rate to avoid the detrimental "gulping" phenomenon identified above, and then to a faster pour rate once a non-liquid through passage is established in spout 30 and neck 104 of the test measure apparatus so that the saturated vapor generated in pour vapor-containment apparatus 10 as described above, can flow freely into the interior of the test measure as the volatile liquid flows from the test measure apparatus. If the pour is accomplished according to the United States or Canadian standard described above, the test measure apparatus should be in an inverted position at a 10-degree to 15-degree angle from vertical during the drain process.

After the above pour process steps are performed, the test measure is held in an inverted (or near inverted) position, for example, as shown in FIG. 6(d) for a period of 10 s in the United States standard and 20 s in the Canadian standard for a drain process step that is typically performed for emptying a test measure apparatus of the present invention according to present test procedures and is described by way of example and not limitation. At the end of the appropriate drain process step, spout 30 of test measure apparatus 100' is withdrawn from inlet 12 of the pour vapor-containment apparatus and cap 36 is inserted over spout outlet 30b preferably as soon as possible to preserve the "wet down" state inside the test measure. The test measure fill, pour and drain process steps can then be repeated for an accuracy test of the meter on the same dispenser or another dispenser.

While the above process steps are generally described in accordance with the United States and Canadian standards described above, one skilled in the art can make the appropriate adjustments to perform the process steps to meet the requirements of other standards while using the apparatus and method of the present invention.

The pour vapor-containment apparatus and test measure methods of the present invention may be used with other liquid volumetric test measure apparatus with appropriate modifications, if necessary, by a skilled artisan.

Orientation terminology such as "upper," "midsection" and "lower" are used as a matter of convenience and not limitation.

The present invention has been described in terms of preferred examples and embodiments. Equivalents, alternatives and modifications, aside from those expressly stated, are possible and within the scope of the invention.

The invention claimed is:

1. A test measure apparatus comprising:
    a cylindrical liquid containment section having a closed bottom;
    a cone section connected to the top of the cylindrical liquid section and sloping inward to a neck connecting end;
    a neck section having a first end connected to the neck connecting end of the cone section, and a second end opposing the first end, the second end forming a neck outlet opening, the combination of the cylindrical liquid containment section, the cone section and the neck section arranged to hold a volume of a volatile liquid from a dispenser having a dispenser meter; and
    a flow control component connected to the neck outlet opening, the flow control component having a length and cross sectional dimension for partial insertion into an inlet of a pour vapor-containment apparatus for containment and generation of a volatile liquid vapor-saturated environment and forming an inserted flow control component and inlet interface, the flow control component comprising a spout in the shape of a skewed elliptical cylinder having a base opening and an outlet opening, the base opening attached to the neck outlet opening, and the outlet opening opposite the base opening, the elliptical cross sections of the spout having a decreasing major axis as the elliptical cross sections progress from the base opening to the outlet opening, the inserted flow control component and inlet interface establishing a vapor seal as the test measure apparatus is rotated about vertical to pour and drain any volatile liquid in the test measure apparatus into the pour vapor-containment apparatus while the vapor-saturated environment in the pour vapor-containment apparatus flows into the test measure apparatus.

2. The test measure apparatus of claim 1 wherein the neck outlet opening is circular and the elliptical cross sections of the spout degenerate to a circle as the cross sections progress towards the base opening of the spout.

3. The test measure apparatus of claim 2 wherein the spout is detachably connected to the neck outlet opening.

4. A method of emptying a volatile liquid from a test measure apparatus for volumetric liquid measurement of the volatile liquid where the test measure apparatus contains an integrated volatile liquid measurement means for determining the volume of the volatile liquid pumped into the test measure apparatus from a dispenser having a dispenser meter for determining the volume of the volatile liquid pumped into the test measure apparatus so that the volume of the volatile liquid determined by the integrated volatile liquid measurement means can be compared with the volume of the volatile liquid determined by the dispenser meter, the method comprising the steps of:

orienting a flow control component on the test measure apparatus so that an outlet end of the flow control component extends into an inlet disposed within a pour vapor-containment apparatus, the inlet in communication with an interior volume of the pour vapor-containment apparatus, the interior volume being closed except for the inlet and a restricted outlet;

orienting the test measure apparatus while the outlet end of the flow control component is extended into the inlet to establish a pour flow of the volatile liquid from the test measure apparatus into the interior volume of the pour vapor-containment apparatus;

at least partially impinging the pour flow of the volatile liquid onto a plate disposed within the pour vapor-containment apparatus to increase the surface area of the volatile liquid and thereby increase the rate of evaporation of the volatile liquid;

maintaining the pour flow at a rate faster than the volatile liquid drains from the restricted outlet to form a volatile liquid seal at the restricted outlet thereby creating a vapor-saturated environment at a positive pressure from the volatile liquid seal within the interior volume of the pour vapor-containment apparatus so that the vapor-saturated environment flows into the test measure apparatus via the outlet end of the flow control apparatus;

withdrawing the flow control component from the inlet after the pour flow and a drain of the volatile liquid from the test measure apparatus; and terminating the volatile liquid seal after the flow control component is withdrawn from the inlet by allowing the volatile liquid forming the volatile liquid seal to drain out of the restricted outlet.

5. The method of claim 4 further comprising the step of redirecting a volatile liquid roll off from the plate by a plurality of scalloped protrusions surrounding the perimeter of the plate to disperse the roll off volatile liquid and thereby increase the rate of evaporation of the volatile liquid.

6. The method of claim 5 further comprising the step of baffling coriolis flow of the volatile liquid forming the volatile liquid seal.

7. A pour vapor-containment apparatus for containment of a vapor created from a pour of a volatile liquid from a test measure apparatus and return of the vapor to the test measure apparatus, the pour vapor-containment apparatus comprising:

an upper section, a midsection and a lower section, the upper section in the shape of a top conical frustum, the midsection in the shape of a cylinder, and the lower section in the shape of a bottom conical frustum invertedly oriented to the top conical frustum, a bottom of the upper section being attached to a top of the midsection and a bottom of the midsection being attached to a top of the lower section;

an upper inlet disposed in the upper section for receiving the pour of the volatile liquid from the test measure apparatus by a flow control component of the test measure apparatus, the flow control component disposed within the upper inlet;

a lower outlet and a flow restricting means disposed in the lower section for restricting the outlet flow of the volatile liquid from the pour vapor-containment apparatus to create a volatile liquid barrier between the lower outlet and an interior volume of the pour vapor-containment apparatus above the volatile liquid barrier at least while the volatile liquid is poured into the pour vapor-containment apparatus;

at least one translucent view port disposed in the upper section for observing the interior volume; and a volatile liquid disperser disposed in the midsection between the upper inlet and the combination of the lower outlet and the flow restricting means for generating a vapor-saturated environment in the interior volume, the interior volume in communication with the flow control component so that the vapor-saturated environment flows from the interior volume into the test measure apparatus as the volatile liquid is poured from the test measure apparatus, the volatile liquid dispenser comprising a plate angularly disposed from vertical in the midsection so that the received pour of the volatile liquid makes contact with at least a portion of a dispersing surface of the plate.

8. The pour vapor-containment apparatus of claim 7 further comprising a plurality of scalloped protrusions disposed around the perimeter of the plate, each of the plurality of scalloped protrusions having an obtuse angle with the dispersing surface of the plate.

9. The pour vapor-containment apparatus of claim 8 wherein the lower outlet is disposed in the bottom of the lower section.

10. The pour vapor-containment apparatus of claim 9 wherein the combination of the lower section and the lower outlet comprises the flow restricting means.

11. The pour vapor-containment apparatus of claim 9 wherein an orifice disposed in the lower section above the lower outlet comprises the flow restricting means.

12. The pour vapor-containment apparatus of claim 11 further comprising at least one baffle disposed in the lower section arranged to suppress a coriolis flow of the volatile liquid in the lower section.

13. A pour vapor-containment apparatus for containment of a vapor created from a pour of a volatile liquid from a test measure apparatus and return of the vapor to the test measure apparatus, the pour vapor-containment apparatus comprising:

an upper section, a midsection and a lower section, the upper section in the shape of a top conical frustum, the midsection in the shape of a cylinder, and the lower section in the shape of a bottom conical frustum invertedly oriented to the top conical frustum, a bottom of the upper section being attached to a top of the midsection and a bottom of the midsection being attached to a top of the lower section;

an upper inlet disposed in the upper section for receiving the pour of the volatile liquid from the test measure apparatus by a flow control component of the test measure apparatus, the flow control component disposed within the upper inlet;

a lower outlet and a flow restricting means disposed in the lower section for restricting the outlet flow of the volatile liquid from the pour vapor-containment apparatus to create a volatile liquid barrier between the lower outlet and an interior volume of the pour vapor-containment apparatus above the volatile liquid barrier at least while the volatile liquid is poured into the pour vapor-containment apparatus; and a volatile liquid disperser disposed in the midsection between the upper inlet and the combination of the lower outlet and the flow restricting means for generating a vapor-saturated environment in the interior volume, the interior volume in communication with the flow control component so that the vapor-saturated environment flows from the interior volume into the test measure apparatus as the volatile liquid is poured from the test measure apparatus, the volatile liquid dispenser comprising a plate angularly disposed from vertical in the midsection so that the received pour of the volatile liquid makes contact with at least a portion of a dispersing surface of the plate.

* * * * *